Patented May 17, 1949

2,470,116

UNITED STATES PATENT OFFICE 2,470,116

SEPARATION OF COMPOUNDS BY CRYSTALLIZATION

Wojciech Swietoslawski and John R. Anderson, Pittsburgh, Pa., assignors to Koppers Company, Inc., Pittsburgh, Pa., a corporation of Delaware No Drawing. Application October 19, 1946, Serial No. 704,534

4 Claims. (Cl. 260—674)

This invention relates to the separation of pure compounds from contaminating constitutents by crystallization. More particularly the invention relates to the purification by crystallization of a compound containing contaminants by utilizing an added substance which forms solid solutions with the compound being purified or with its contaminating constitutents, or both.

It is common practice to employ solvents when separating substances by crystallization. In such practice the solvent is generally used to modify the viscosity of the mother liquor, or to change the crystallization rate, or to lower the crystallization temperature. Solvents may be used also in the processes claimed in this invention, although in some cases they may not be required.

The primary object of this invention is to provide a method of obtaining pure compounds by separating them from their contaminants in a mixture by adding to the mixture undergoing crystallization a substance which forms solid solutions with the compound undergoing crystallization, or with the contaminants, or with both, whereby the contaminants are concentrated either in the crystals formed or in the mother liquor. The precipitation of the crystals is carried out either with or without using a solvent.

A further object of the invention is to provide a method of separating pure compounds from their contaminants by crystallization wherein the substance which is added for forming the solid solutions with the compound undergoing purification, or its contaminants, or both, can be readily separated from the crystals formed and from the mother liquor by an adequately chosen conventional method.

If the compound undergoing purification and one of its contaminants form a binary eutectic and these two components are present in the mixture in substantially eutectic proportions, such a composition cannot be separated by ordinary crystallization or by crystallization from solvents. We have found, however, that such a eutectic composition may be separated if there is added to it a substance which has a higher freezing temperature than the freezing temperature of each component in the eutectic and which forms solid solutions with one or both components of the eutectic. Preferably a sufficient amount of the substance should be added to cause the solid solutions to crystallize close to the freezing temperature of the highest freezing temperature component. We have found also that, if the freezing temperature of the two components forming a eutectic mixture are not very different from each other, the crystallization of the solid solutions enriched in the higher melting component may be effectively carried out at a temperature close to the freezing temperature of the eutectic. The higher the temperature of freezing of the solid solutions and the wider is the difference in the freezing temperatures of the substances forming the eutectic, the more complete is the separation of one component in the crystals formed and the other component in the mother liquor. When the solid solution is crystallized it is removed from the mother liquor, and this solid solution, containing a higher concentration of the higher melting component than found in the eutectic composition, is added to other crystals containing the same high melting component in substantially the same concentration. The mother liquor, in turn, which contains a higher concentration of the lower melting component is added to a similar mother liquor. Thereafter one or more recrystallization may be carried out in a fractional manner with the addition of more of the substance to form solid solutions and with each crystallization an enrichment of each of the components, one in the crystals and one in the mother liquor, will take place. Finally, the enrichment of the crystals in the higher melting component and the mother liquor in the lower melting component will be substantially complete or it will reach such a state of completion that the components being in excess, one in the crystals and one in the mother liquor, may be removed by ordinary crystallization. In either case the substance added should be removed from the crystals and from the mother liquor by an adequately chosen conventional method, and the mixtures so obtained should undergo ordinary crystallization so as to obtain the pure components, one or the other of which is in excess in both of the mixtures. Any remaining eutectic composition is then recycled to further treatment as previously described.

It is to be understood that when referring to the freezing temperature of the eutectic and the components of the eutectic that, when the components are dissolved in a solvent all of these temperatures will be shifted downward due to the presence of the solvent.

The substance used for forming the solid solutions preferably should be such that it may be separated from the component, or components by conventional procedures. For example, it should be chosen so that its boiling temperature is sufficiently different from that of the components to be separated, or from the solvent if one is used, that it may be removed by ordinary distillation.

On the other hand it may be chosen so that its solubility in water, or in aqueous solutions of acids or bases, is sufficiently different from that of the components to be separated, that it may be separated by extraction. In other cases differences in azeotropic properties or adsorption properties, may be utilized to remove the added substance from the components to be separated.

Many of the compounds which form binary eutectics are quite viscous. Therefore, it is advisable with such compounds to use a non-viscous solvent to condition the mother liquor as to viscosity to facilitate the crystallization and separation of the crystals.

Accordingly another object of the invention is to provide a method of separation of a compound from its contaminants with a substance which will form a solid solution with the compound, or the contaminant, or both, in a non-viscous solvent which will modify the viscosity of the mother liquor to facilitate crystallization and separation of the solid solutions formed from the mother liquor.

With these and other objects in view, the invention consists in the method of recovering pure compounds from mixtures by crystallization with a substance having a higher freezing temperature than the freezing temperature of the compound and which forms solid solutions with the compound or its contaminants or both, as hereinafter described and particularly defined in the claims.

The present invention pertains more particularly to the separation of organic compounds which are contaminated with other organic substances. In most cases a full purification or separation connot be obtained by a single crystallization with a substance forming the solid solutions, and therefore, the invention contemplates a series of crystallizations in which the desired compounds are concentrated by each crystallization and finally reach a concentration wherein a further crystallization, and then separation of the added substance, will provide a pure compound.

The separation of thionaphthene from its oily contaminants may serve as an example of the invention.

A crude thionaphthene, which had been recovered from crude naphthalene, was found to be extremely difficult to purify by ordinary crystallization or distillation because the contaminants boiled very close to the boiling temperature of thionaphthene and were sorbed on the crystals during the crystallization, either with or without a solvent. When an amount of pure naphthalene was added to the crude thionaphthene, however, it was found that a solid solution of naphthalene-thionaphthene could be crystallized from solvents which was substantially free from the contaminants originally associated with the crude thionaphthene. The naphthalene-thionaphthene solid solution thus obtained could then be separated by azeotropic distillation using methylcarbitol as the azeotropic agent, and naphthalene in excess in the mother liquor could be removed by ordinary crystallization from methanol, used as solvent.

The naphthalene-thionaphthene solid solution can also be separated into its components by another method. For example, when the solid solution is dissolved in methanol, sufficient betanaphthol in excess of the amount of naphthalene, is added to form a solid solution of betanaphthol-naphthalene which will crystallize above the crystallization temperature of naphthalene. After a series of crystallizations are carried out in a fractional manner, crystals of betanaphthol-naphthalene solid solution are separated from a mother liquor consisting of betanaphthol and thionaphthene dissolved in the solvent. The betanaphthol can now be separated from the crystals and the mother liquor by an extraction with an aqueous solution of sodium hydroxide or any other strong base, with the result that the thionaphthene is obtained in a pure state from the mother liquor and the naphthalene is recovered in a pure state from the betanaphthol-naphthalene solid solution.

Another example consists in the purification of crude naphthalene. This material usually contains thionaphthene and oily contaminants, and the latter only are separated effectively by ordinary crystallization from solvents. If, however, an excess of betanaphthol is added to the crude naphthalene dissolved in a solvent, the bulk of the naphthalene can be separated, in a series of fractional crystallizations, as the betanaphthol-naphthalene solid solution and from this material the betanaphthol can be removed as described above, producing naphthalene in a highly purified state.

The excess betanaphthol is then removed from the mother liquor by extraction as mentioned above. Then the thionaphthene-naphthalene solid solution is precipitated from that liquor and is separated into its two pure components by one of the methods described above.

Mixtures of alpha- and betaethylnaphthalene serve as examples of the separation of substances forming binary eutectics. The complete separation of an alpha- and betaethylnaphthalene eutectic by simple crystallization is impossible because the solid precipitate of the eutectic composition has the same composition as the liquid mixture. We have found that a partial enrichment of both the solid and the liquid phase can be accomplished, even when dealing with eutectic compositions, by adding betanaphthol which is characterized by a higher melting point than the eutectic mixture, and which forms solid solutions with both components of the eutectic. It is preferable to use such an amount of betanaphthol as to have a precipitate formed in a region below the normal melting temperature of alpha- or betaethylnaphthalene. After precipitation and filtration the betanaphthol should be removed by any conventional known method from both the precipitate and the mother liquor as stated above. In this way the precipitate is enriched in betaethylnaphthalene and the mother liquor is enriched in alphaethylnaphthalene. The crystallization steps may be repeated one or more times so that after removing the betanaphthol and dissolving these fractions in a solvent, we are able to remove the component in excess as a pure product and to return the remaining material which has a composition equal to or close to that of the eutectic, into the cycle and to treat it as previously described. In this way the eutectic mixture may be considered as separated into its components by crystallization.

The preferred form of the invention having been thus described, what is claimed as new is:

1. A method of separating the components of a binary eutectic composed of alpha- and beta-ethyl naphthalene comprising: melting the eutectic mixture with betanaphthol, cooling the melted mixture to a temperature to crystallize the beta-ethylnaphthalene as a solid solution, said temperature being above the eutectic temperature, separating the precipitated solid solution of betaethylnaphthalene and betanaphthol from the mother liquor, adding the separated crystals to another solid solution having a concentration of betaethylnaphthalene at least equal to the concentration of the betaethylnaphthalene in the solid solution separated, adding more betanaphthol to the solid solution and re-crystallizing the concentrated solid solution a sufficient number of times to enrich the precipitate in betaethylnaphthalene and to enrich the mother liquor in alphaethylnaphthalene, removing by extraction betanaphthol from the solid solution composed of betaethylnaphthalene and betanaphthol and from the mother liquor composed of betanaphthol and alphaethylnaphthalene, separating the enriched betaethylnaphthalene and the alphaethylnaphthalene from the extracted solid solution and mother liquor by crystallization, and returning eutectic recovered by the crystallization separation to the original melting step for further treatment.

2. The method defined in claim 1 in which the amount of betanaphthol added is in excess by weight of the amount of betaethylnaphthalene and alphaethylnaphthalene in the mixture being crystallized.

3. The method defined in claim 1 in which the final crystallizations of alpha- and betaethylnaphthalenes are carried out in the presence of a methanol solvent.

4. The method defined in claim 1 in which the betanaphthol is extracted from the solid solution and mother liquor with water and an aqueous solution of a strong base.

WOJCIECH SWIETOSLAWSKI.
JOHN R. ANDERSON.

REFERENCES CITED

The following references are of record in the file of this patent:

UNITED STATES PATENTS

| Number | Name | Date |
|---|---|---|
| 1,779,287 | Pfaff et al. | Oct. 27, 1930 |
| 1,820,645 | Bennett | Aug. 25, 1931 |
| 1,991,389 | Henderson et al. | Feb. 19, 1935 |
| 2,038,640 | Burk | Apr. 28, 1936 |

FOREIGN PATENTS

| Number | Country | Date |
|---|---|---|
| 119,855 | Great Britain | Apr. 17, 1919 |